(12) United States Patent
Kojima

(10) Patent No.: US 7,528,610 B2
(45) Date of Patent: May 5, 2009

(54) LOAD BREAK DETECTION CIRCUIT

(75) Inventor: Akio Kojima, Anjo (JP)

(73) Assignee: DENSO CORPORATION, Kariya (JP)

( * ) Notice: Subject to any disclaimer, the term of this patent is extended or adjusted under 35 U.S.C. 154(b) by 94 days.

(21) Appl. No.: 11/808,589

(22) Filed: Jun. 12, 2007

(65) Prior Publication Data

US 2008/0001606 A1   Jan. 3, 2008

(30) Foreign Application Priority Data

Jun. 30, 2006   (JP)   .............................. 2006-181511

(51) Int. Cl.
    *G01R 31/14*   (2006.01)
    *G01R 31/08*   (2006.01)

(52) U.S. Cl. ...................... 324/509; 324/522

(58) Field of Classification Search ........................ None
See application file for complete search history.

(56) References Cited

U.S. PATENT DOCUMENTS

| | | | |
|---|---|---|---|
| 5,747,978 A * | 5/1998 | Gariboldi et al. ............. | 323/313 |
| 6,232,781 B1 | 5/2001 | Göser et al. | |
| 6,377,053 B1 * | 4/2002 | Mazzucco et al. ........... | 324/509 |
| 7,064,553 B2 * | 6/2006 | Tani et al. .................... | 324/509 |
| 7,176,693 B2 * | 2/2007 | Tsuchiya ..................... | 324/509 |
| 2005/0083066 A1 | 4/2005 | Tani et al. | |
| 2006/0082376 A1 * | 4/2006 | Allen et al. ................. | 324/522 |

FOREIGN PATENT DOCUMENTS

| | | |
|---|---|---|
| JP | A-10-9027 | 1/1998 |
| JP | A-11-210533 | 8/1999 |

OTHER PUBLICATIONS

Office Action dated May 21, 2008 in corresponding German patent application No. 10 2007 029 357.9-26 (and English translation).

* cited by examiner

*Primary Examiner*—Timothy J Dole
*Assistant Examiner*—Jeff Natalini
(74) *Attorney, Agent, or Firm*—Posz Law Group, PLC

(57) ABSTRACT

A load break detection circuit for detecting a break in a load connected to an output terminal of an output circuit includes a target voltage generator, a reference voltage generator, and a comparator. The reference voltage generator generates a reference voltage and a command value. When the output terminal is open-circuited, a flyback voltage is applied to the output terminal and the target voltage generator outputs a target voltage equal to the command value to the output terminal. The target voltage generator includes a voltage divider for dividing an output voltage appearing at the output terminal. The comparator compares the divided voltage with the reference voltage and outputs a load break detection signal based on a result of the comparison.

4 Claims, 7 Drawing Sheets

US 7,528,610 B2

LOAD BREAK DETECTION CIRCUIT

CROSS REFERENCE TO RELATED APPLICATION

This application is based on and incorporates herein by reference Japanese Patent Application No. 2006-181511 filed on Jun. 30, 2006.

FIELD OF THE INVENTION

The present invention relates to a load break detection circuit for detecting a break in a load driven by an output circuit.

BACKGROUND OF THE INVENTION

An injector for a vehicle engine is driven by a solenoid valve and sprays fuel for a predetermined period of time to produce a fuel-air mixture. A common-rail fuel injection system disclosed in JP-A-11-210533 is used for a diesel engine and includes a break detection circuit for detecting a break in an injector. In the fuel injection system, flyback energy generated in a solenoid coil in a control valve for controlling discharge rate of a supply pump charges a capacitor for driving a solenoid valve of the injector. The break in the injector is detected based on the capacitor charge condition at a predetermined time.

A driving circuit disclosed in JP-A-10-9027 includes a circuit for passing a subtle current through a solenoid and a resistor connected in series with the solenoid during a period when an injector is not driven. The subtle current is small enough not to drive the solenoid. A break in the injector is detected by comparing the subtle current flowing through the resistor with a reference current.

A fuel injection electronic control unit (ECU) increases a flyback voltage (i.e., back electromotive force), which is generated when a solenoid valve is turned off, to about 70 volts to improve the responsivity of the solenoid valve of an injector. Therefore, a driver integrated circuit (IC) used in the fuel injection ECU is required to withstand a voltage greater than the flyback voltage of about 70 volts.

For example, a solenoid valve of an injector is broken down when a solenoid coil is broken (i.e., open-circuited) or short-circuited to a ground line, or a power line. The present inventor considers adding a diagnosis function to detect a break in the solenoid coil to such a driver IC. A driver IC 1 shown in FIG. 7 includes a MOSFET 3 for energizing a solenoid coil 2 as a load, a gate driver 4 for driving the MOSFET 3, and a break detection circuit 7 for implementing a diagnostic function to detect a break in the solenoid coil 2. The break detection circuit 7 includes a target voltage generator 5 and a window comparator 6.

When the solenoid coil 2 is broken (i.e., the solenoid coil 2 is open-circuited), the target voltage generator 5 exhibits a voltage clamp action. The voltage clamp action clamps a voltage at an output terminal $1d$ to a target voltage VT during a period of time when the MOSFET 3 is off. The target voltage generator 5 has less ability to output an electric current. Therefore, when the solenoid coil 2 is not broken, the target voltage generator 5 does not exhibit the voltage clamp action. The break detection circuit 7 compares the voltage at the output terminal $1d$ with a reference voltage by using the window comparator 6 and outputs a break detection signal Sdiag based on a result of the comparison.

In the driver IC 1, a flyback voltage of about 70 volts is applied to the output terminal $1d$. Therefore, the driver IC 1 is required to withstand a voltage greater than the flyback voltage of about 70 volts.

SUMMARY OF THE INVENTION

In view of the above-described problem, it is an object of the present invention to provide a load break detection circuit for detecting a break in a load, the load break detection circuit having a withstand voltage greater than a flyback voltage generated in the load.

A load break detection circuit is connected between a power line and a ground line and detects a break in a load driven by an output circuit. The output circuit has an output terminal connected between the power line and the load and has an output transistor connected between the output terminal and the ground line. The load break detection circuit includes a target voltage generator, a reference voltage generator, and a comparator.

The target voltage generator outputs a target voltage to the output terminal of the output circuit. The target voltage is midway between a power voltage on the power line and a ground voltage on the ground line. The target voltage generator includes a voltage divider circuit that is connected between the output terminal and the ground line and has a predetermined division ratio to output a detection voltage by dividing an output voltage at the output terminal. The reference voltage generator generates a first reference voltage and a second reference voltage. The first reference voltage is between a divided power voltage defined by dividing the power voltage by the voltage divider circuit and a divided target voltage defined by dividing the target voltage by the voltage divider circuit. The second reference voltage is between the divided target voltage and a divided ground voltage defined by dividing the ground voltage by the voltage divider circuit. The comparator compares the detection voltage with each of the first and second reference voltages and outputs a break detection signal based on a result of the comparison.

The target voltage generator further includes a constant current circuit having a first end connected to the power line, a first transistor connected to the ground line and having a control terminal to which a voltage equal to the target voltage is applied, a first diode connected between a second end of the constant current circuit and the first transistor, a second transistor connected to the power line and having a control terminal connected to the second end of the constant current circuit, and a second diode connected between the second transistor and the output terminal.

When the load is broken, the target voltage generator outputs the target voltage to the output terminal of the output circuit during a period of time when the output transistor is off. The target voltage is midway between the power voltage on the power line and the ground voltage on the ground line. The voltage divider circuit generates the detection voltage by dividing the output voltage at the output terminal and output the detection voltage to the comparator. Further, the reference voltage generator generates the first reference voltage between the divided power voltage and the divided target voltage and generates the second reference voltage between the divided target voltage and the divided ground voltage. The comparator compares the detection voltage with each of the first and second reference voltages and outputs the break detection signal based on the result of the comparison. Therefore, a state of the break detection signal outputted from the comparator is different between when the load is broken and when the load is not broken.

In the target voltage generator, when the voltage equal to the target voltage is applied to the control terminal of the first transistor, a first current flows from the power line to the ground line through the constant current source, the first diode, and the first transistor. Also, a second current flows from the power line to the ground line through the second transistor, the second diode, and the voltage divider circuit. A control voltage across the first transistor is equal to a control voltage across the second transistor. Therefore, when the load is broken, the target voltage appears at the output terminal during the period of time when the output transistor is off.

The detection voltage applied to the comparator is generated by dividing the output voltage at the output terminal by the voltage divider circuit with the division ratio. Thus, the detection voltage applied to the comparator can be smaller than the output voltage at the output terminal. Therefore, even if a flyback voltage, which is generated in the load when the output transistor is turned off, is applied to the output terminal, the comparator can withstand the detection voltage by setting the division ratio to a certain value. Further, the second diode has a reverse breakdown voltage high enough to protect the target voltage generator from the flyback voltage.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
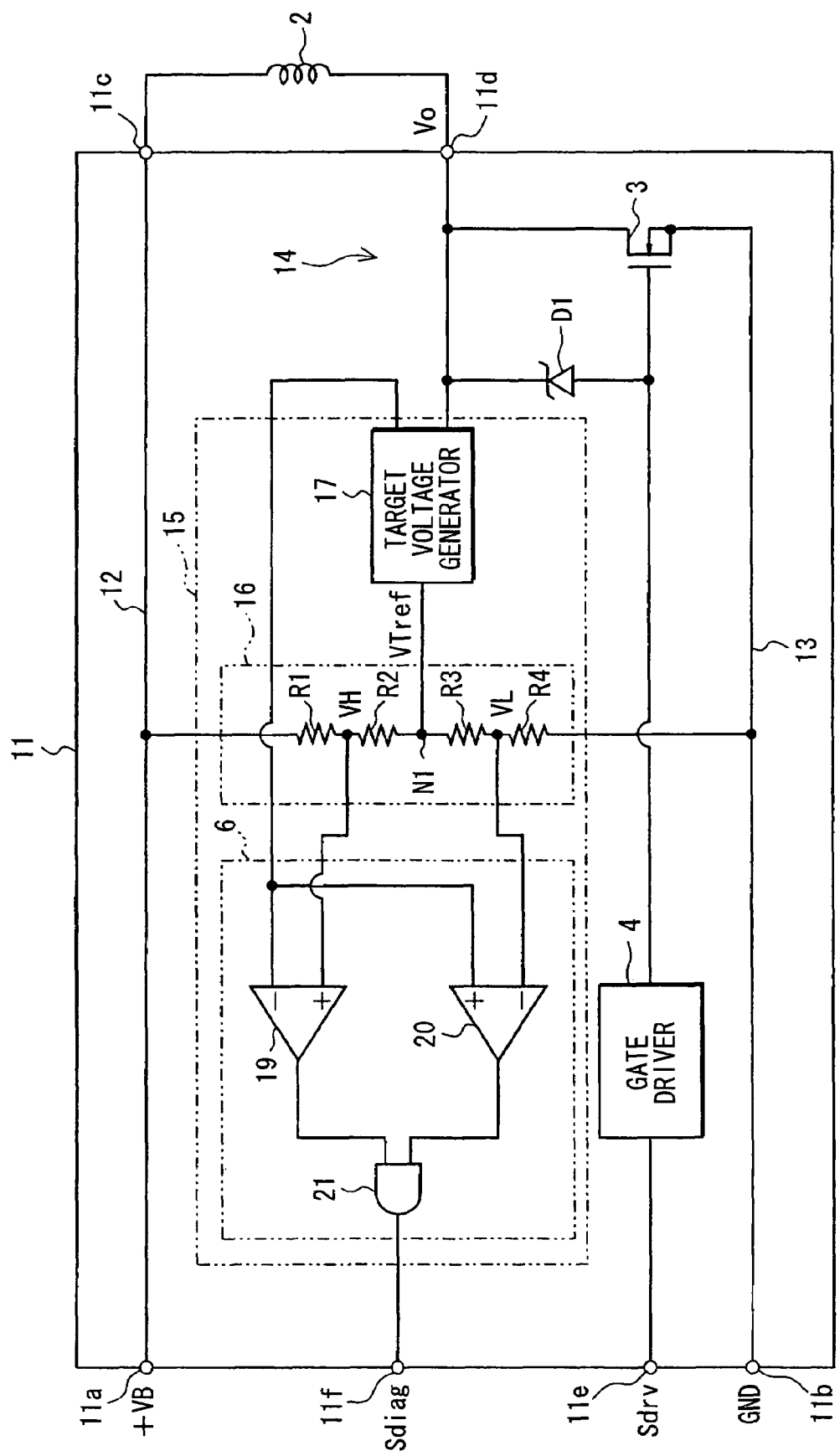
FIG. 1 is a block diagram of a driver IC including a load break detection circuit according to a first embodiment of the present invention.

A driver integrated circuit (IC) 11 shown in FIG. 1 is included in a fuel injection electronic control unit (ECU) for a fuel injector for a vehicle engine. The fuel injection ECU further includes a control IC (not shown) having a microcomputer. The driver IC 11 opens and closes a solenoid valve of the fuel injector in accordance with a drive signal Sdrv fed from the control IC.

The fuel injection ECU controls fuel injection by opening and closing the solenoid valve of the fuel injector. The control IC receives vehicle data such as engine speed data, cylinder discrimination data, and accelerator opening data from a crank angle sensor, cylinder discrimination sensor, and an accelerator opening sensor, respectively. The control IC monitors engine condition based on the received vehicle data and determines the optimal timing and amount of the fuel injection based on the monitored engine condition. Then, the control IC drives and controls a solenoid coil 2 in the solenoid valve through the driver IC 11.

As shown in FIG. 1, the driver IC 11 includes an output circuit 14 and a load break detection circuit 15. A power supply terminal 11a of the driver IC 11 is connected to a positive supply voltage +VB, and a ground terminal 11b of the driver IC 11 is connected to a ground voltage GND. The ground voltage GND may be, for example, 0 volts. In the driver IC 11, the power supply terminal 11a is connected to a power line 12 that is connected to an output terminal 11c. The ground terminal 11b is connected to a ground line 13. The solenoid coil 2 is connected between the output terminal 11c and an output terminal 11d.

The output circuit 14 energizes and deenergizes the solenoid coil 2 in accordance with the drive signal Sdrv fed via a signal input terminal 11e of the driver IC 11. The break detection circuit 15 performs a diagnostic function to detect a break in the solenoid coil 2 and outputs a break detection signal Sdiag to the control IC via a signal output terminal 11f of the driver IC 11.

The output circuit 14 includes a zener diode D1, an N-channel metal oxide semiconductor field-effect transistor (MOSFET) 3, and a gate driver 4 connected to the gate of the MOSFET 3. The drain of the MOSFET 3 is connected to the output terminal 11d and the source of the MOSFET 3 is connected to the ground line 13. The zener diode D1 is connected between the drain and gate of the MOSFET 3. Specifically, the cathode of the zener diode D1 is connected to the drain of the MOSFET 3, and the anode of the zener diode D1 is connected to the gate of the MOSFET 3. The zener diode D1 conducts when an output voltage Vo at the output terminal 11d exceeds an upper limit Vfb of a flyback voltage. When the zener diode D1 conducts, the MOSFET 3 is turned on so that the solenoid coil 2 is energized. A zener voltage (i.e., reverse breakdown voltage) Vz1 of the zener diode D1 is set as follows: Vz1=Vfb−Vth, where Vth is a threshold voltage of the MOSFET 3.

The break detection circuit 15 includes a reference voltage generator 16, a target voltage generator 17, and a window comparator 6. The break detection circuit 15 is supplied with the positive supply voltage +VB via the power line 12 and the ground line 13.

The reference voltage generator 16 includes resistors R1-R4 that are connected in series between the power line 12 and the ground line 13. A voltage VH appears at a node between the resistors R1, R2, a voltage VTref appears at a node N1 between the resistors R2, R3, and a voltage VL appears at a node between the resistors R3, R4. The voltages VH, VL are reference voltages for the window comparator 6, and the voltage VTref is a command value for the target voltage generator 17.

Figure 2:
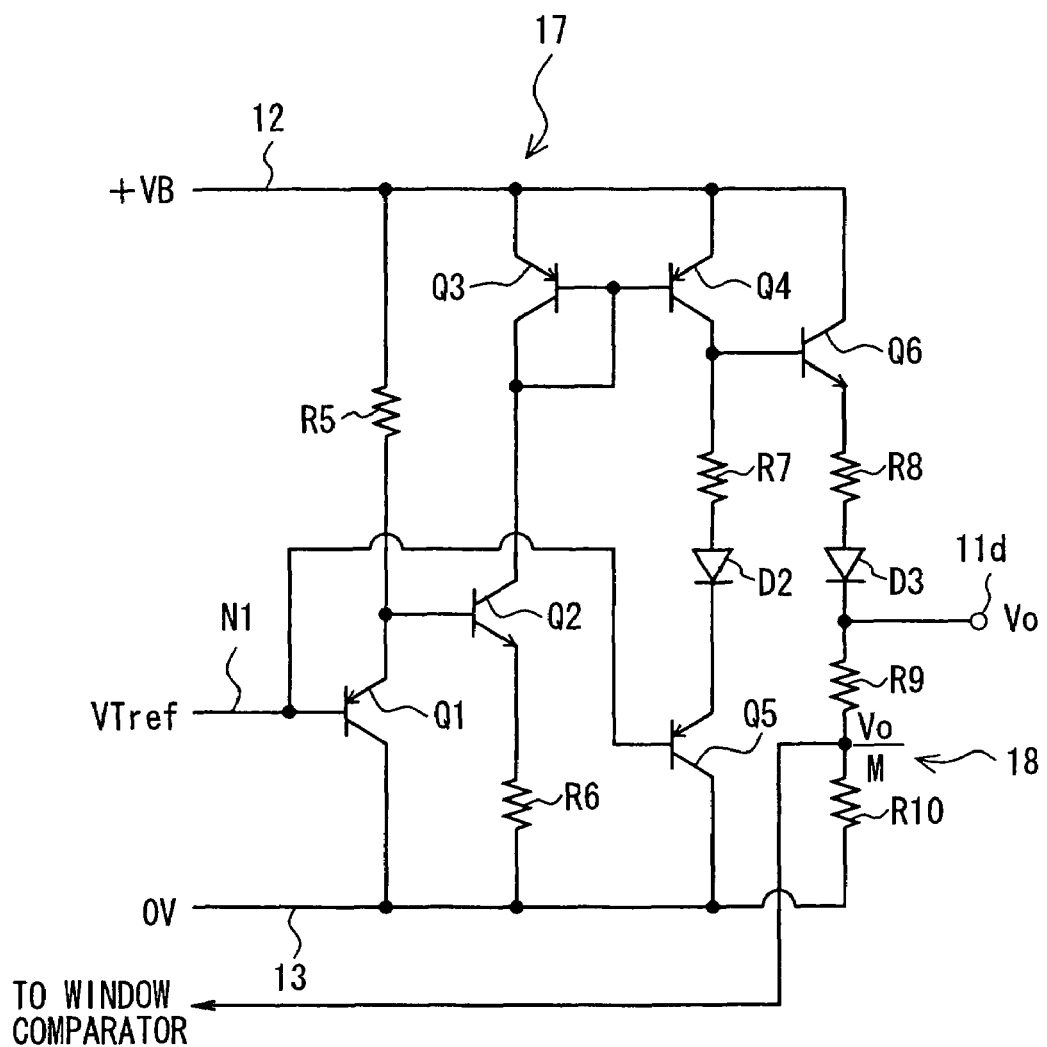
FIG. 2 is a schematic diagram of a target voltage generator in the load break detection circuit of FIG. 1.

The target voltage generator 17 outputs a target voltage VT to the output terminal 11d. The target voltage VT is midway between the positive supply voltage +VB on the power line 12 and the ground voltage GND on the ground line 13. As shown in detail in FIG. 2, the target voltage generator 17 includes transistors Q1-Q6, resistors R5-R10, and diodes D2, D3. The transistors Q1, Q3-Q5 are PNP transistors, and the transistors Q2, Q6 are NPN transistors.

The collector of the transistor Q1 is connected to the ground line 13 so that the transistor Q1 acts as an emitter follower. The base of the transistor Q1 is connected to the node N1 between the resistors R2, R3 of the reference voltage generator 16. The emitter of the transistor Q1 is connected to the power line 12 via the resistor R5.

The base of the transistor Q2 is connected between the emitter of the transistor Q1 and the resistor R5. The emitter of the transistor Q2 is connected to the ground line 13 via the resistor R6. The transistor Q2 passes an electric current, which depends on an output voltage of the transistor Q1, through the transistor Q3.

The bases of the transistors Q3, Q4 are connected to each other and connected between the collectors of the transistors Q2, Q3. The emitters of the transistors Q3, Q4 are connected to the power line 12 so that the transistors Q3, Q4 form a current mirror. Thus, the transistor Q4 acts as a constant current source. The collector of the transistor Q5 is connected to the ground line 13, and the base of the transistor Q5 is connected to the node N1. The resistor R7 and the diode D2 are connected in series between the collector of the transistor Q4 and the emitter of the transistor Q5.

The base of the transistor Q6 is connected to the collector of the transistor Q4. The corrector of the transistor Q6 is connected to the power line 12. The resistor R8 and the diode D3 are connected in series between the emitter of the transistor Q6 and the output terminal 11d. The resistors R9, R10 are connected in series between the output terminal 11d and the ground line 13. The resistors R9, R10 form a voltage divider circuit 18 with a voltage division ratio 1/M, so that a divided output voltage Vo/M appears at a node between the resistors R9, R10. The voltage division ratio 1/M is defined as follows:
1/M=R10/(R9+R10)

Return to FIG. 1, the window comparator 6 includes comparators 19, 20, and a two-input AND gate 21. An output of the comparator 19 is connected to a first input of the AND gate 21, and an output of the comparator 20 is connected to a second input of the AND gate 21. An output of the AND gate 21 is connected to the signal output terminal 11f of the driver IC 11. The reference voltage VH is applied to a non-inverting input of the comparator 19, and the reference voltage VH is applied to an inverting input of the comparator 20. The divided output voltage Vo/M is applied to an inverting input of the comparator 19 and also applied to a non-inverting input of the comparator 20.

In the driver IC 11, the MOSFET 3 is on when the drive signal Sdrv fed via the signal input terminal 11e is a high level. In contrast, the MOSFET 3 is off when the drive signal Sdrv is a low level. When the drive signal Sdrv changes from the high level to the low level, the solenoid coil 2 is deenergized so that the flyback voltage (i.e., back electromotive force) is generated in the solenoid coil 2. When the flyback voltage reaches the upper limit Vfb, the threshold voltage Vth is applied to the gate of the MOSFET 3 via the zener diode D1. As a result, the MOSFET 3 is turned on so that the solenoid coil 2 is energized. The flyback voltage needs to be increased to about 70 volts to improve the responsibility of the solenoid valve of the fuel injector.

When the output terminal 11d is open-circuited, the target voltage generator 17 outputs the target voltage VT to the output terminal 11d. In short, a first current, which depends on the resister R6 and the voltage VTref, flows through the transistors Q2, Q3. Then, a mirror current of the first current flows through the transistor Q4, the resistor R7, the diode D2, and the transistor Q5. A portion of the mirror current flows into the base of the transistor Q6. Thus, the transistor Q6 is turned on so that a second current flows through the transistor Q6, the resistor R8, the diode D3, and the voltage divider circuit 18.

In a case where base-emitter voltages Vbe of the transistors Q5, Q6 are equal, voltage drops across the transistors R7, R8 are equal, and forward voltages Vf of the diodes D2, D3 are equal, the target voltage VT, which appears at the output terminal 11d when the output terminal 11d is open-circuited due to the break in the solenoid coil 2, becomes equal to the voltage VTref appearing at the node N1. The voltage drops across the transistors R7, R8 becomes equal, when resistances of the transistors R7, R8 are equal and the currents flowing through the transistors R7, R8 are equal.

When the solenoid coil 2 is broken (i.e., the solenoid coil 2 is open-circuited), the target voltage generator 17 exhibits a voltage clamp action. The voltage clamp action clamps the output voltage Vo at the output terminal 11d to the target voltage VT during a period of time when the MOSFET 3 is off. Specifically, when the drive signal Sdrv is the high level, the output voltage Vo at the output terminal 11d is zero volts. As a result, the outputs of the comparators 19, 20 become the high and low levels, respectively, so that the break detection signal Sdiag becomes the low level. In contrast, when the drive signal Sdrv is the low level, the output voltage Vo at the output terminal 11d is clamped to the target voltage VT. As a result, each of the outputs of the comparators 19, 20 becomes the high level so that the break detection signal Sdiag becomes the high level.

In contrast, when the solenoid coil 2 is not broken, the target voltage generator 17 does not exhibit the voltage clamp action. Specifically, when the drive signal Sdrv is the high level, the output voltage Vo at the output terminal 11d is zero volts. As a result, the outputs of the comparators 19, 20 become the high and low levels, respectively, so that the break detection signal Sdiag becomes the low level. In contrast, when the drive signal Sdrv is the low level, the output voltage Vo at the output terminal 11d is the positive supply voltage +VB. As a result, the outputs of the comparators 19, 20 become the low and high levels, respectively, so that the break detection signal Sdiag also becomes the low level.

As described above, the break detection signal Sdiag becomes the high level, only when the solenoid coil 2 is broken, i.e., open-circuited. Therefore, the break in the solenoid coil can be detected based on the fact that the break detection signal Sdiag becomes the high level.

The output voltage Vo at the output terminal 11d is divided by the voltage divider circuit 18 with the voltage division ratio 1/M so that the divided output voltage Vo/M is applied to the window comparator 6. Therefore, a withstand voltage of each of the comparators 19, 20 can be reduced to one Mth of the upper limit Vfb of the flyback voltage. In practice, it is preferable to leave some margin for safety.

The diode D3 has a reverse breakdown voltage greater than a voltage obtained by subtracting the positive supply voltage +VB from the upper limit Vfb of the flyback voltage. Therefore, even when the upper limit Vfb of the flyback voltage is applied to the output terminal 11d, the transistors Q4, Q6 can be protected by the diode D3. In short, the diode D3 protects the overall target voltage generator 17 from the flyback voltage. Further, even if the diode D3 is broken down, the resistor R8, which is connected in series with the diode D3, limits the current flowing into the target voltage generator 17 so that the target voltage generator 17 can be protected.

Since the divided output voltage Vo/M is applied to the window comparator 6, the reference voltages VH, VL generated by the reference voltage generator 16 are set to satisfy the following inequality:

$$VT/M < VH < +VB/M \qquad (1)$$

$$0 < VL < VT/M \qquad (2)$$

Thus, the reference voltage VH is set between a divided target voltage VT/M defined by dividing the target voltage VT by the voltage divider circuit 18 with the division ratio 1/M and a divided supply voltage +VB/M defined by dividing the positive supply voltage +VB by the voltage divider circuit 18 with the division ratio 1/M. The reference voltage VL is set between the divided target voltage VT/M and a divided ground voltage GND/M defined by dividing the ground voltage GND (i.e., 0 volts) by the voltage divider circuit 18 with the division ratio 1/M.

As described above, the driver IC 11 according to the first embodiment includes the break detection circuit 15, which has the target voltage generator 17, the reference voltage generator 16, and the window comparator 6. The target voltage generator 17 outputs the target voltage VT to the output terminal 11*d* of the driver IC 11 to clamp the output voltage Vo at the output terminal 11*d* to the target voltage VT. The reference voltage generator 16 generates the reference voltages VH, VL. The window comparator 6 compares the divided output voltage Vo/M with each of the reference voltages VH, VL and outputs the break detection signal Sdiag based on a result of the comparison. Therefore, the break in the solenoid coil 2 can be surely detected based on the break detection signal Sdiag.

The output voltage Vo at the output terminal 11*d* is divided by the voltage divider circuit 18 with the voltage division ratio 1/M so that the divided output voltage Vo/M is applied to the window comparator 6. In such an approach, even when the upper limit Vfb of the flyback voltage is applied to the output terminal 11*d*, the window comparator 6 can be protected from the flyback voltage. Further, the reverse breakdown voltage of the diode D3, which is connected between the output terminal 11*d* and the target voltage generator 17, is very high. Therefore, even when the upper limit Vfb of the flyback voltage is applied to the output terminal 11*d*, the target voltage generator 17 can be protected from the flyback voltage. Furthermore, the resistor R8 is connected in series with the diode D3. Therefore, even when the diode D3 is broken down due to the flyback voltage, the resistor R8 limits the current flow into the target voltage generator 17 to protect the target voltage generator 17.

The series circuit of the diode D3 and the resistor R8 causes a difference between the command value VTref and the target voltage VT. To compensate the difference, the series circuit of the diode D2 and the resistor R7 is provided between transistors Q4, Q5. Thus, the target voltage VT becomes equal to the command value VTref.

The reference voltage generator 16 generates the command value VTref by dividing the supply voltage +VB by using a voltage divider circuit constructed with the resistors R1-R4. Also, the reference voltages VH, VL are generated by using the voltage divider circuit constructed with the resistors R1-R4. Thus, the command value VTref and the reference voltages VH, VL are generated by using the same circuit. In such an approach, the window comparator 6 can accurately output the break detection signal Sdiag, regardless of start up and shut down sequence of the supply voltage +VB. Further, even when the supply voltage +VB varies, the window comparator 6 can accurately output the break detection signal Sdiag.

Second Embodiment

Figure 3:
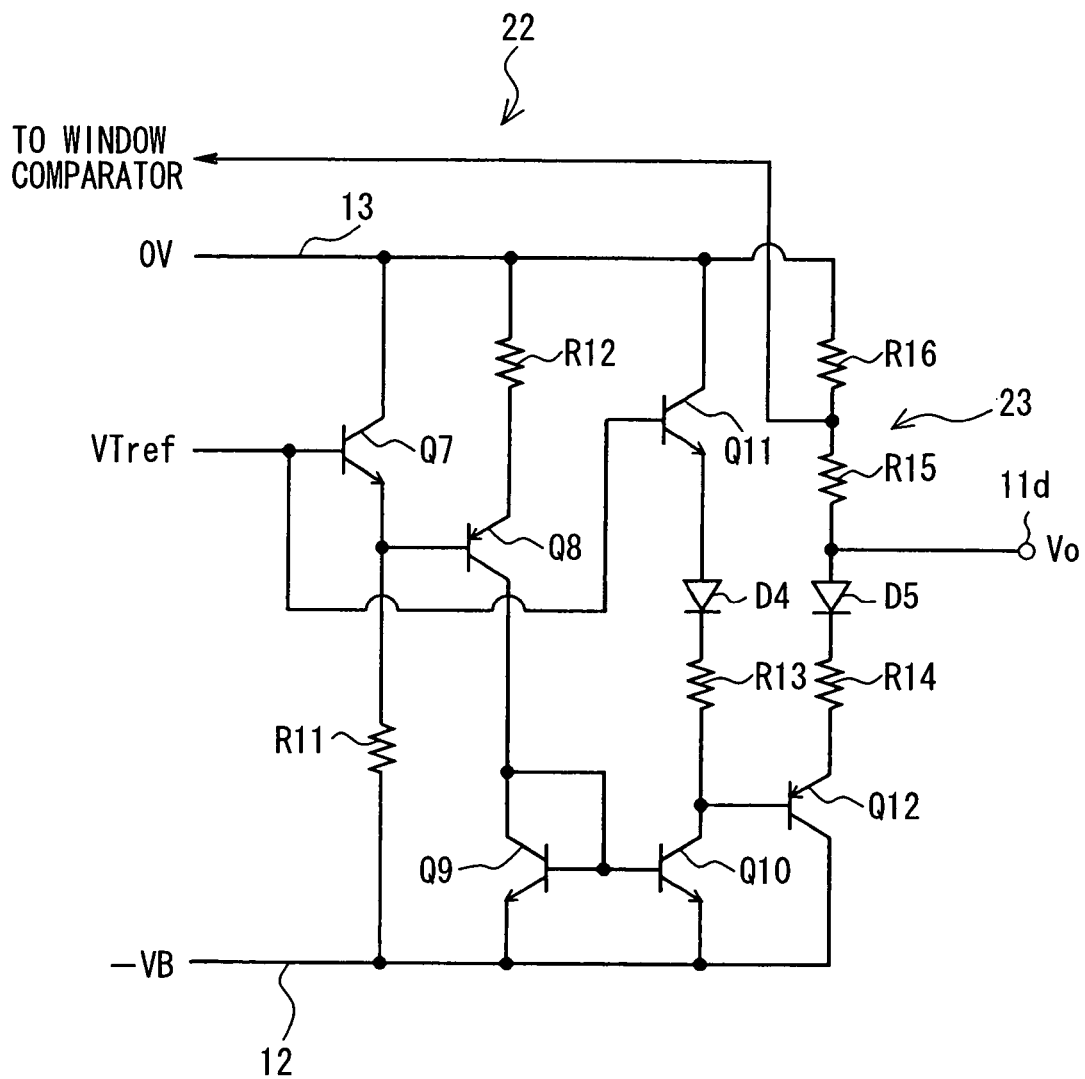
FIG. 3 is a schematic diagram of a target voltage generator according to a second embodiment of the present invention.

A target voltage generator 22 according to a second embodiment of the present invention is shown in FIG. 3. The target voltage generator 22 according to the second embodiment is used when the driver IC 11 operates with an negative supply voltage −VB, whereas the target voltage generator 17 according to the first embodiment is used when the driver IC 11 operates with the positive supply voltage +VB. As can be seen by comparing FIGS. 2, 3, the target voltage generator 22 is actually equivalent to the target voltage generator 17.

The target voltage generator 22 includes transistors Q7-Q12, resistors R11-R16, and diodes D4, D5. The resistors R15, R16 form a voltage divider circuit 23. The transistors Q7, Q9-Q11 are NPN transistors, and the transistors Q8, Q12 are PNP transistors. The transistors Q7-Q12, the resistors R11-R16, and the diodes D4, D5 of the target voltage generator 22 correspond to the transistors Q1-Q6, the resistors R5-R10, and the diodes D2, D3 of the target voltage generator 17, respectively.

Third Embodiment

Figure 4:
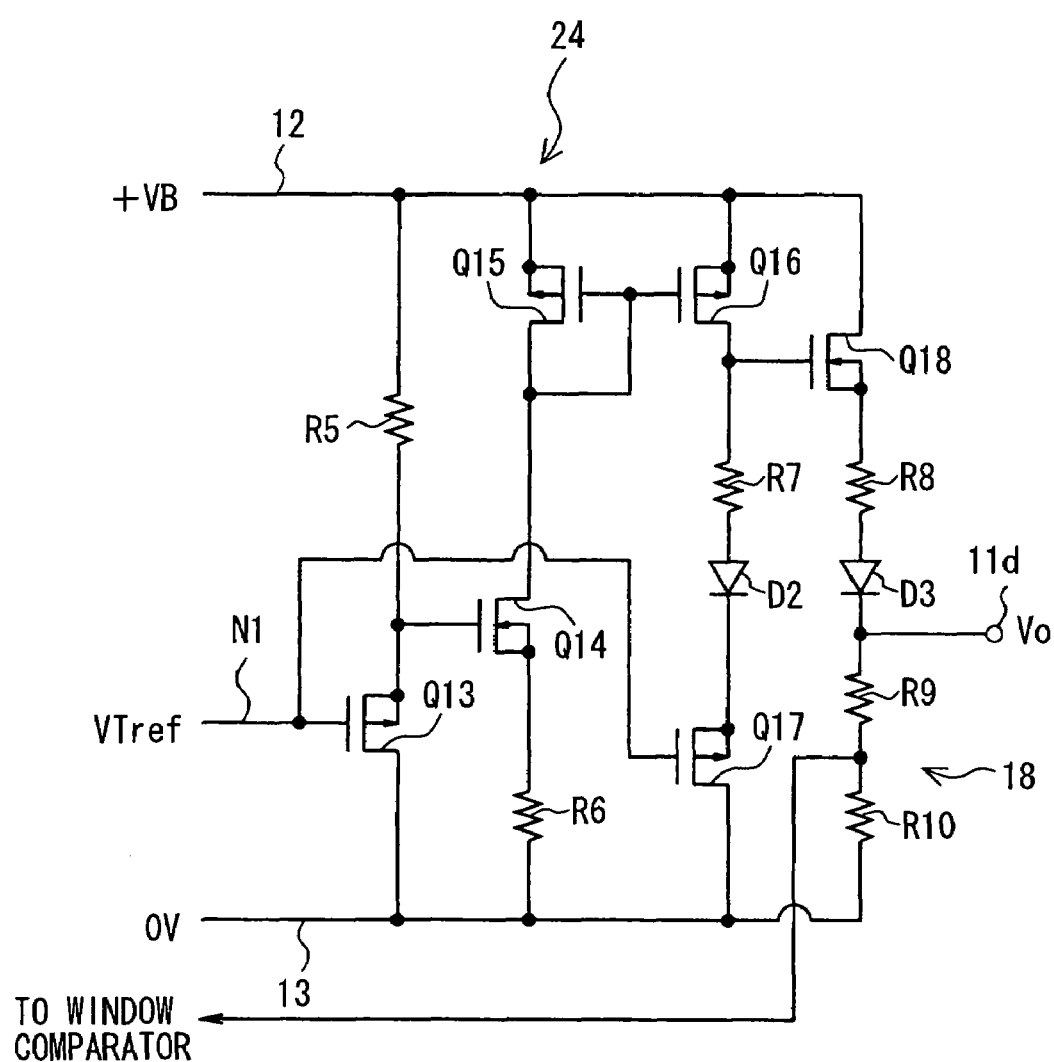
FIG. 4 is a schematic diagram of a target voltage generator according to a third embodiment of the present invention.

A target voltage generator 24 according to a third embodiment of the present invention is shown in FIG. 4. As can be seen by comparing FIGS. 2, 4, a difference between the target voltage generators 17, 24 is that the target voltage generator 24 includes MOSFETs Q13-Q18 replacing the bipolar transistors Q1-Q6 of the target voltage generator 17.

Fourth Embodiment

Figure 5:
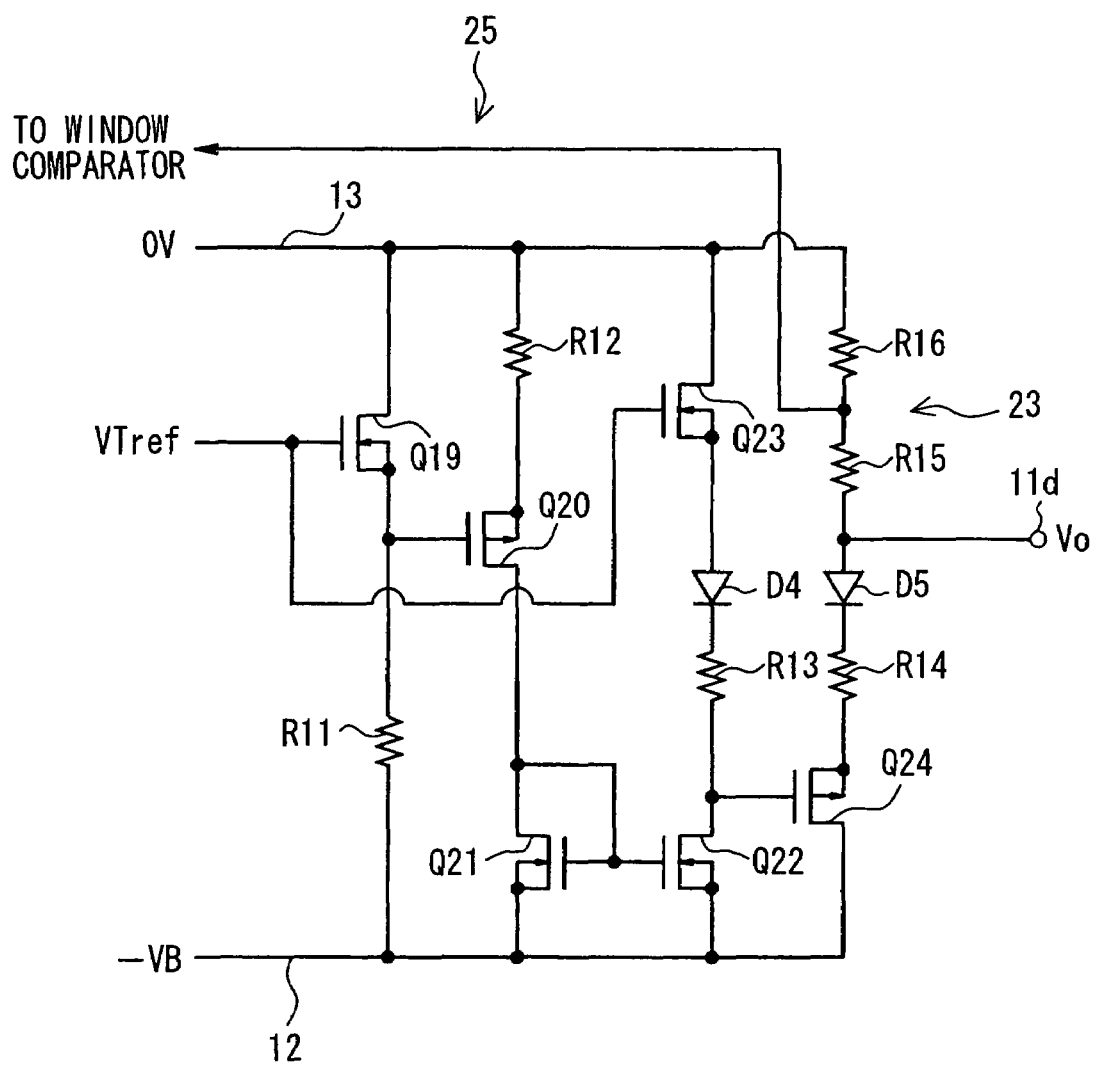
FIG. 5 is a schematic diagram of a target voltage generator according to a fourth embodiment of the present invention.

A target voltage generator 25 according to a fourth embodiment of the present invention is shown in FIG. 5. As can be seen by comparing FIGS. 3, 5, a difference between the target voltage generators 22, 25 is that the target voltage generator 25 includes MOSFETs Q19-Q24 replacing the bipolar transistors Q7-Q12 of the target voltage generator 22.

Fifth Embodiment

Figure 6:
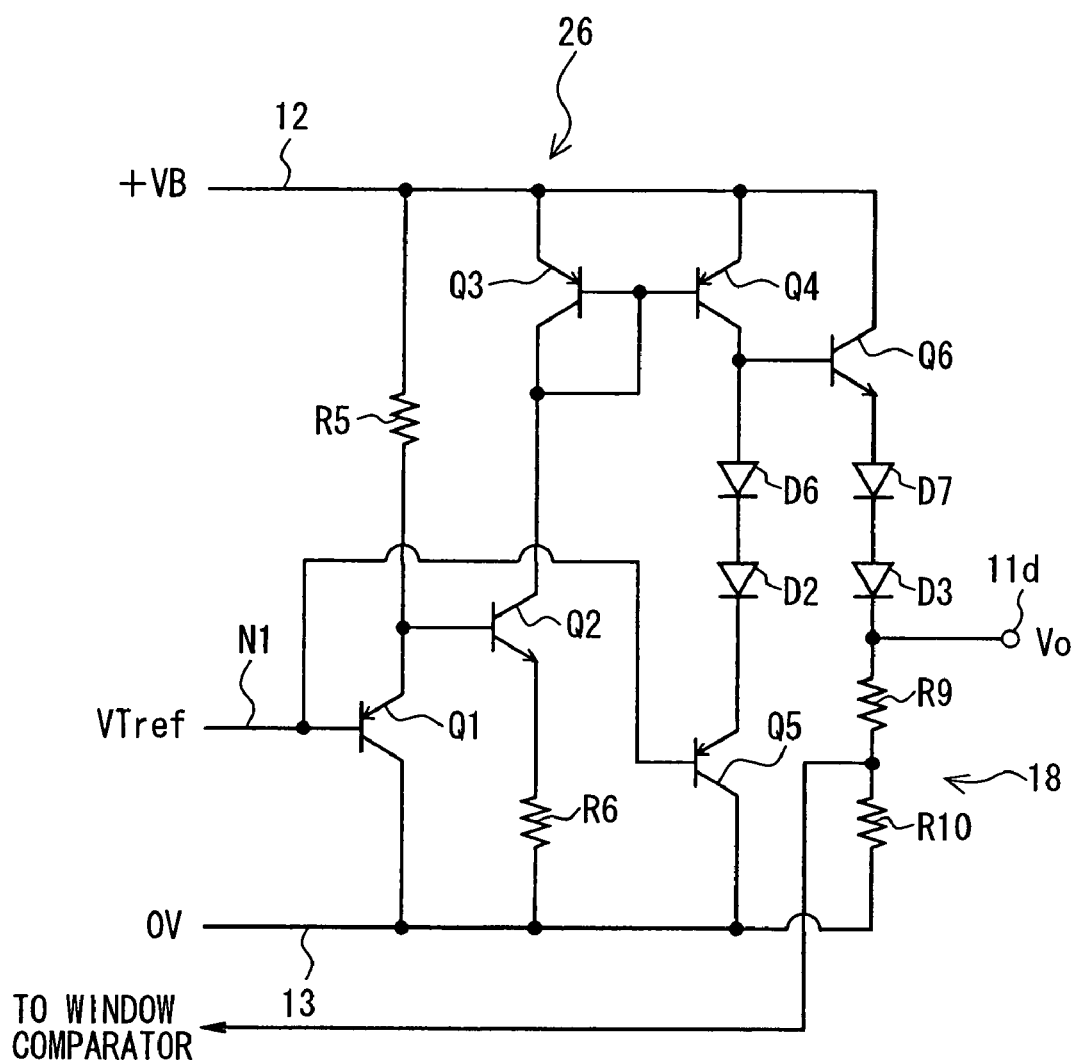
FIG. 6 is a schematic diagram of a target voltage generator according to a fifth embodiment of the present invention.
Figure 7:
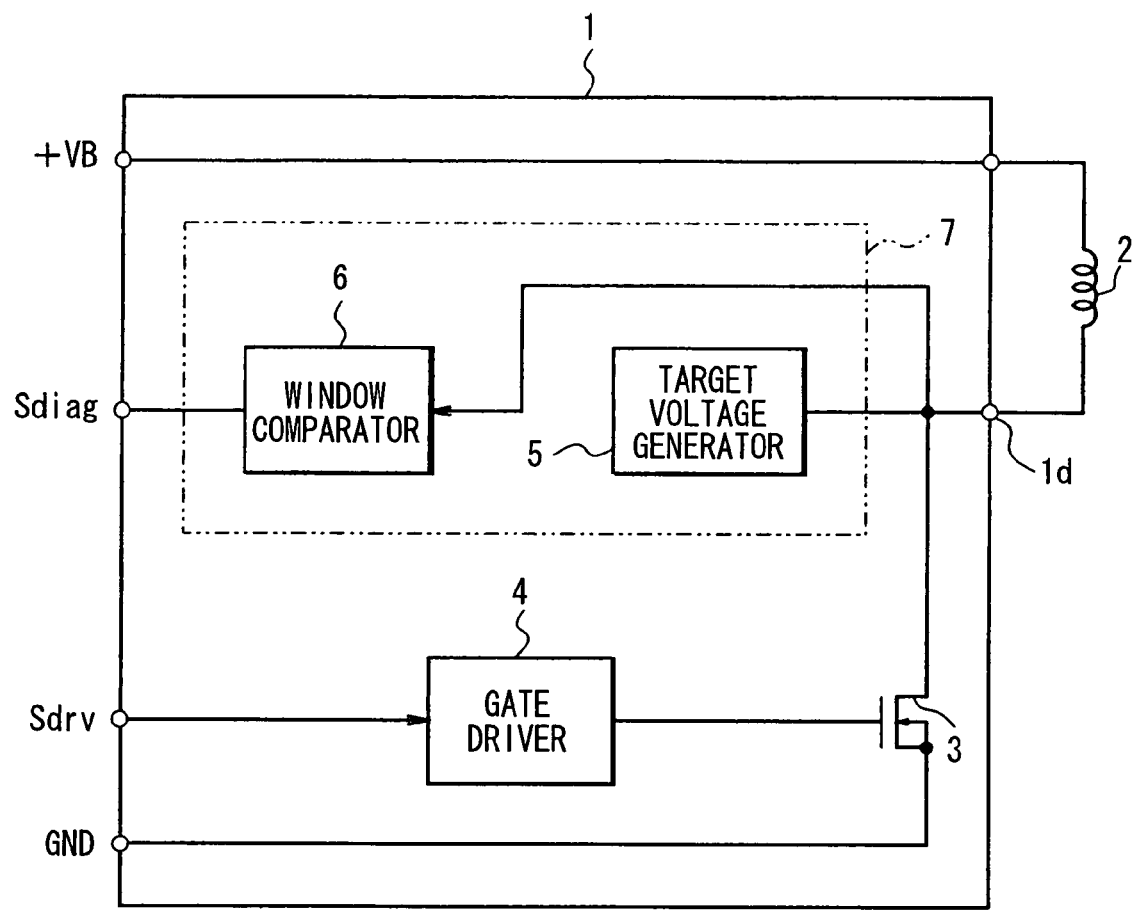
FIG. 7 is a block diagram of a conventional driver IC.

A target voltage generator 26 according to a fifth embodiment of the present invention is shown in FIG. 6. As can be seen by comparing FIGS. 2, 6, a difference between the target voltage generators 17, 26 is that the target voltage generator 26 includes diodes D6, D7 replacing the resistors R7, R8 of the target voltage generator 17.

(Modifications)

The embodiment described above may be modified in various ways. For example, the solenoid coil 2 may be other inductive load. As with the fifth embodiment, the resistors R7, R8, R13, R14 of the second, third, and forth embodiments may be replaced with diodes. The ground voltage GND may be a voltage other than 0 volts.

Such changes and modifications are to be understood as being within the scope of the present invention as defined by the appended claims.

What is claimed is:

1. A load break detection circuit connected between a power line and a ground line and for detecting a break in a load driven by an output circuit, the output circuit having an output terminal connected between the power line and the load and having an output transistor connected between the output terminal and the ground line, the load break detection circuit comprising:

a target voltage generator for outputting a target voltage to the output terminal of the output circuit, the target voltage being midway between a power voltage on the power line and a ground voltage on the ground line, the target voltage generator including a voltage divider circuit that is connected between the output terminal and the ground line and has a predetermined division ratio to output a detection voltage by dividing an output voltage at the output terminal;

a reference voltage generator for generating a first reference voltage and a second reference voltage, the first reference voltage being between a divided power voltage defined by dividing the power voltage by a second voltage divider circuit and a divided target voltage defined by dividing the target voltage by the second voltage divider circuit, the second reference voltage being between the divided target voltage and a divided ground voltage defined by dividing the ground voltage by the second voltage divider circuit; and a comparator for comparing the detection voltage with each of the first and second reference voltages and for outputting a break detection signal based on a result of the comparison, wherein the target voltage generator further includes a constant current circuit having a first end connected to the power line, a first transistor connected to the ground line and having a control terminal to which a voltage equal to the target voltage is applied, a first diode connected between a second end of the constant current circuit and the first transistor, a second transistor connected to the power line and having a control terminal connected to the second end of the constant current circuit, and a second diode connected between the second transistor and the output terminal.

2. The load break detection circuit according to claim 1, wherein the target voltage generator further includes a first resistor connected in series with the first diode and a second resistor connected in series with the second diode.

3. The load break detection circuit according to claim 2, wherein a first resistance of the first resistor is equal to a second resistance of the second resistor.

4. The load break detection circuit according to claim 1, wherein at least one of the first diode and the second diode includes a plurality of diode members connected in series.

* * * * *